July 31, 1951 — A. A. HEJDUK — 2,562,494

PRESSURE MEASURING APPARATUS

Filed Sept. 20, 1945 — 2 Sheets-Sheet 1

TO VACUUM

TO AIR SUPPLY

TO AIR SUPPLY

INVENTOR.
Arthur A. Hejduk
BY
Evans + McCoy
ATTORNEYS

July 31, 1951     A. A. HEJDUK     2,562,494
PRESSURE MEASURING APPARATUS

Filed Sept. 20, 1945     2 Sheets-Sheet 2

INVENTOR.
Arthur A. Hejduk
BY
Evans & McCoy
ATTORNEYS

Patented July 31, 1951

2,562,494

UNITED STATES PATENT OFFICE 2,562,494

PRESSURE MEASURING APPARATUS

Arthur A. Hejduk, Cleveland, Ohio, assignor to The Meriam Instrument Company, Cleveland, Ohio, a corporation of Ohio Application September 20, 1945, Serial No. 617,463

15 Claims. (Cl. 73—401)

1

This invention relates to fluid pressure apparatus and particularly to a pressure measuring apparatus suitable for use in calibrating pressure indicating instruments.

The invention has for its object to provide a pressure measuring device of the manometer type that is compact and conveniently operable and in which a wide range in pressures may be read upon apparatus of convenient height.

A further object of the invention is to provide a calibrating device having means for applying either vacuum or pressure to the instrument to be calibrated and having a manometer so connected to the instrument and to the sources of pressure and vacuum as to register on a single scale pressures either above or below atmospheric.

With the above and other objects in view the invention may be said to comprise the apparatus as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
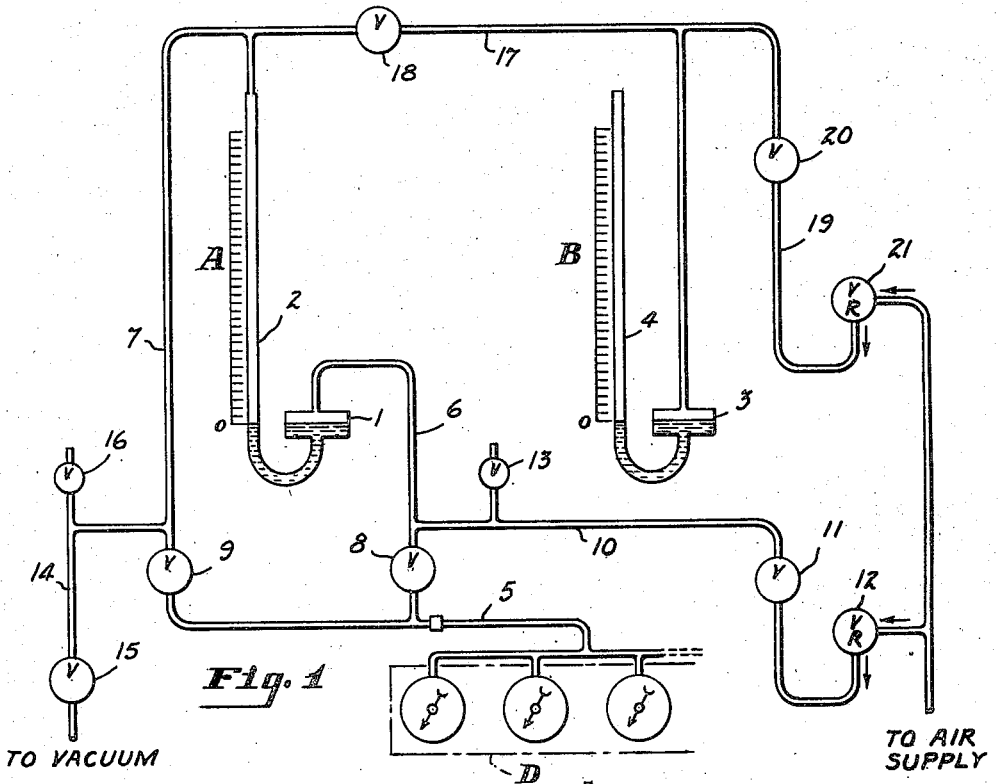
Figure 1 is a diagrammatic view showing a pressure measuring apparatus embodying the invention.

In Fig. 1 of the drawings apparatus embodying the invention is shown diagrammatically. This apparatus includes a main manometer A and an auxiliary manometer B, the manometer A having a well 1 and a vertical indicating tube 2 and the manometer B having a well 3 and a vertical indicating tube 4. The manometers are connected to suitable pressure supply lines and to an instrument rack D that carries the instruments to be calibrated. A suitable outlet connection 5 is provided for supplying fluid under pressure to the instrument rack D. The connection 5 may be connected to the well 1 of the main manometer A through a conduit 6 or to the upper end of the indicating tube 2 of the manometer A through a conduit 7. A valve 8 in

2 the conduit 6 is adapted to establish or disestablish communication between the outlet 5 and the well 1, and a valve 9 in the conduit 7 is adapted to establish or disestablish communication between the outlet 5 and the upper end of the tube 2.

A pressure supply conduit 10 opens into the conduit 6 between the valve 8 and the well 1 and a cut off valve 11 is provided in this conduit which when open permits fluid under pressure to be delivered to the conduit 6 and which when closed serves to trap the fluid under pressure in conduits 6 and 10. A suitable pressure regulator 12 is preferably interposed between the air valve 11 and the pressure source and a vent valve 13 is provided between the valve 11 and the well 1 to permit escape of fluid under pressure to the atmosphere when desired.

A vacuum conduit 14 is connected to the conduit 7 between the valve 9 and the upper end of the indicating tube 2, the conduit 14 being provided with a cut off valve 15 which may be closed to maintain a fixed subatmospheric pressure in the conduit 7. Between the valve 9 and the upper end of the tube a vent valve 16 is provided which may be operated to admit air into the conduit 7 to decrease the vacuum.

A pressure balancing conduit 17 connects the upper end of the manometer tube 2 to the well 3 of the auxiliary manometer B. A valve 18 is provided in the conduit 17 to cut off communication between the manometers A and B, or to establish a pressure balancing connection between the well of the auxiliary manometer B and the upper end of the indicating tube 2 of the main manometer A. A conduit 19 connects the pressure balancing conduit 17 to a suitable source of fluid under pressure and the conduit 19 is provided with a cut off valve 20 and a pressure regulator 21 similar to the valves 11 and regulator 12 of the pressure supply conduit 10.

Assuming that all valves are closed the vent valves 13 and 16 are opened to balance the pressures in the well 1 and tube 2 preparatory to the pressure measuring operation. Pressure may then be applied to liquid in the well 1 and to the instruments on the rack D by opening the valves 8 and 11 and the pressure so applied may be regulated by operating the vent valve 13. When the desired pressure is established the valves 11 and 13 are closed and the pressure is allowed to equalize between the instruments and the well 1.

In calibrating pressure registering instruments it is desirable that pressure be adjusted and accurately measured for successive units of pressure. For example, the pressure first applied to the well 1 and instruments on the rack D may be the pressure necessary to raise the column of liquid in the tube 2 to a desired graduation on the indicating scale alongside the tube, whereupon the valve 11 may be closed to trap the fluid under pressure in the line connecting the manometer to the instruments being calibrated, after which by suitable manipulation of the valves 11 and 13 the pressure may be increased step by step to cause the meniscus of the liquid column to register with successive graduations of the manometer scale while the readings on the instruments are checked against the readings on the manometer.

If it is desired to test instruments for measuring subatmospheric pressures, the valves are all closed and vent valve 13 is opened to establish atmospheric pressure in the well 1. The valve 9 is opened to connect the instrument rack D with the conduit 7 and the valves 15 and 16 are manipulated to establish a subatmospheric or negative pressure in the conduit 7, which is indicated on the scale of the manometer A. Successive readings on the manometer and instruments being calibrated may be taken as the pressure in the tube 7 is decreased step by step. After the lowest pressure in the conduit 7 has been registered the valve 15 may be closed and the height of the liquid column in the tube 2 may then be reduced step by step by manipulation of the vent valve 16 so that successive readings on the manometer tube may again be compared with the readings on the instruments on the rack D while the pressure is being increased step by step.

It is often desirable to calibrate instruments registering pressures higher than can be registered upon a manometer of convenient length and in order to provide readings on scales of convenient length, one or more auxiliary manometers are provided which serve to measure an opposing pressure applied to the upper end of the main manometer tube. The auxiliary manometer B as shown in Fig. 1 has its well 3 subjected to the same pressure as the upper end of the tube 2 when the pressure balancing valve 18 is opened and a desired pressure may be applied to the well 3 and tube 2 by opening the valve 20 in the conduit 19.

Pressures higher than can be registered by the manometer A alone may be measured by means of the two connected manometers A and B. After the pressure which the manometer A is capable of measuring has been applied and while the manometer A is subjected to this pressure the valve 18 may be opened and pressure may be admitted through the valve 20 to the conduit 17 to apply pressure to the well 3 of the auxiliary manometer B. The pressure in the conduit 6 connected to the instruments to be calibrated will be the sum of the readings on the two manometers, and it will be apparent that pressures up to the sum of the pressures capable of being measured by the two manometers may be accurately measured.

Pressures may be intermittently introduced alternately into the conduits 17 and 6 through the valves 20 and 11 and successive readings may be taken on the manometers and instruments while the pressure is being built up to the point where the liquid columns in both tubes 2 and 4 are at the upper limit of the indicating scales.

For conveniently checking the readings on the instruments from the highest pressure down after the pressure in the tubes 5 and 6 has been built up to the maximum, the vent valve 13 may be manipulated to lower the column of liquid in the tube 2 step by step to the zero point, after which the vent valve 16 may be opened to permit the pressure to escape from the balancing conduit 17 which will cause the liquid column in the tube 4 to fall to the zero point and the liquid column in the tube 2 to again rise to adjacent the upper end of the tube, after which the vent valve 13 may be again manipulated to lower the liquid column in the tube 2 step by step to the zero point.

Figure 2:
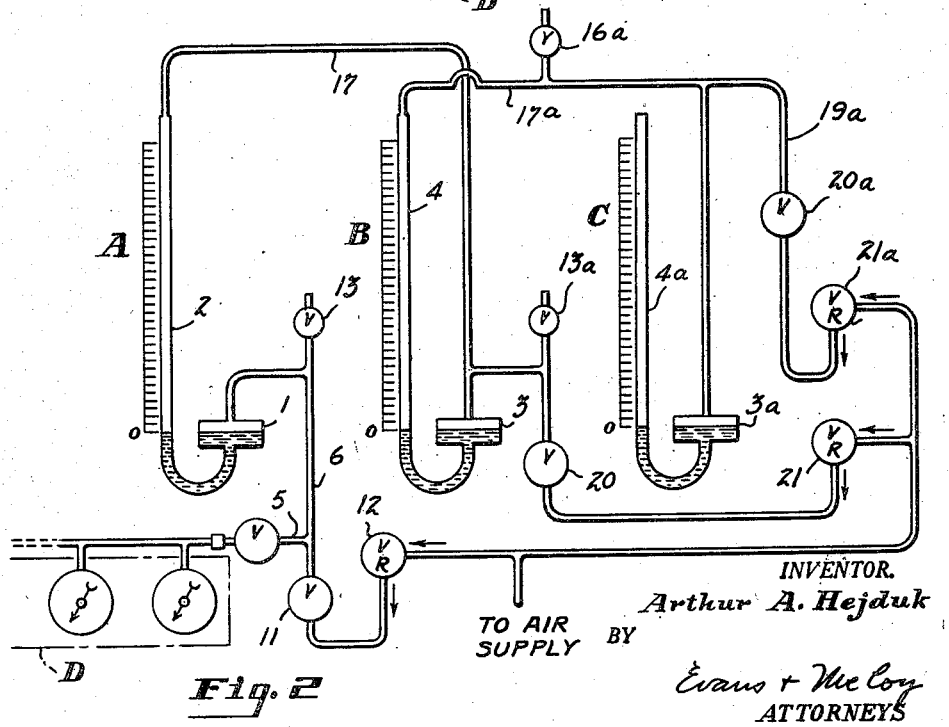
Fig. 2 is a diagrammatic view showing a series of manometer tubes so interconnected as to register pressures throughout a greater range.

If measuring of pressures through a wider range is desired, a series of manometers may be connected as indicated diagrammatically in Fig. 2 of the drawings in which a third manometer C is interconnected with the manometers A and B. The manometers A and B are the same as in Fig. 1 except that the vacuum connection to manometer A is omitted. When the vacuum connection is omitted the valve 18 shown in Fig. 1 is unnecessary and this valve is also omitted in Fig. 2. The second auxiliary manometer C has its well 3a connected to the upper end of the tube 4 of the manometer B by a pressure balancing conduit 17a, the conduit 19a having a cut-off valve 20a and a pressure regulator 21a corresponding to the valve 20 and regulator 21 of the secondary pressure supply conduit. A vent valve 16a is connected to the conduit 17a so that atmospheric pressure can be established in the balancing conduit 17a and in the tube 4 when desired.

While the manometer tubes A and B only are being employed the valve 20a is closed and the vent valve 16a is opened so that the upper end of the tube 4 is in communication with the atmosphere as in Fig. 1. After the pressure in the conduit 6 has been raised by manipulation of the valves 11, 13 and 20 as above described to the capacity of the combined manometers A and B, pressure may be admitted to the conduit 17a to apply balancing pressure to the upper end of the tube 4 which will force the liquid down in the tube 4. Pressure may then be admitted to the conduit 17 through the valve 20 to raise the liquid column in the tube 4 and lower the liquid column in the tube 2. The valves 20a, 20, 11 and 13 may be manipulated to bring the liquid columns in tubes 4 and 4a to the top graduations of their indicating scales and the column in tube 2 to the zero point of the scale, after which successive readings may be taken on the scale of manometer A by manipulating the valve 11 to raise the liquid to desired points in the tube 2 and to maintain the column in tube 4 at the top graduation of its indicating scale. After the maximum measurable pressure has been established in the conduits 5 and 6, readings may be taken as the pressure applied to the instruments through the conduit 5 is lowered step by step by manipulation of the vent valve 13.

After the liquid column of manometer A has been lowered to the zero point, the valve 13a may be manipulated to lower the pressure in the conduit 17 to a point where the level of the liquid column in manometer B is lowered to zero and the level of the liquid column in manometer A is raised to the top graduation of the scale of manometer A. The vent valve 16a may then be opened to reduce the pressure in the conduit 17a to atmospheric, returning the liquid column in manometer C to the zero point and raising the liquid column in manometer B, after which the pressure applied to the instruments being calibrated may be reduced step by step and readings taken on manometers A and B as in the modification first described.

The manometers may be connected to the same or separate sources of air under pressure. If the sources of pressure are separate the source of pressure to which the well of manometer A is connected must be capable of supplying the highest pressure to be measured, the source connected to the well of manometer B need only be capable of supplying a pressure equal to the highest pressure less the capacity of manometer A, and manometer C need only be capable of supplying a pressure equal to the maximum less the combined capacity of manometers A and B.

If mercury column manometers are used, the barometric pressure will be about 30" and if the length of each manometer scale is 60 inches, the manometer set shown in Fig. 1 will measure absolute pressures up to 150" of mercury and the set shown in Fig. 2 will measure pressures above atmospheric up to 180" of mercury. Extremely high manometer tubes are very inconvenient even in stationary installations and are extremely objectionable in portable calibrating sets. The present invention provides a simple and inexpensive manometer set in which a very wide range of pressures may be indicated on conveniently located scales of moderate length.

Figure 3:
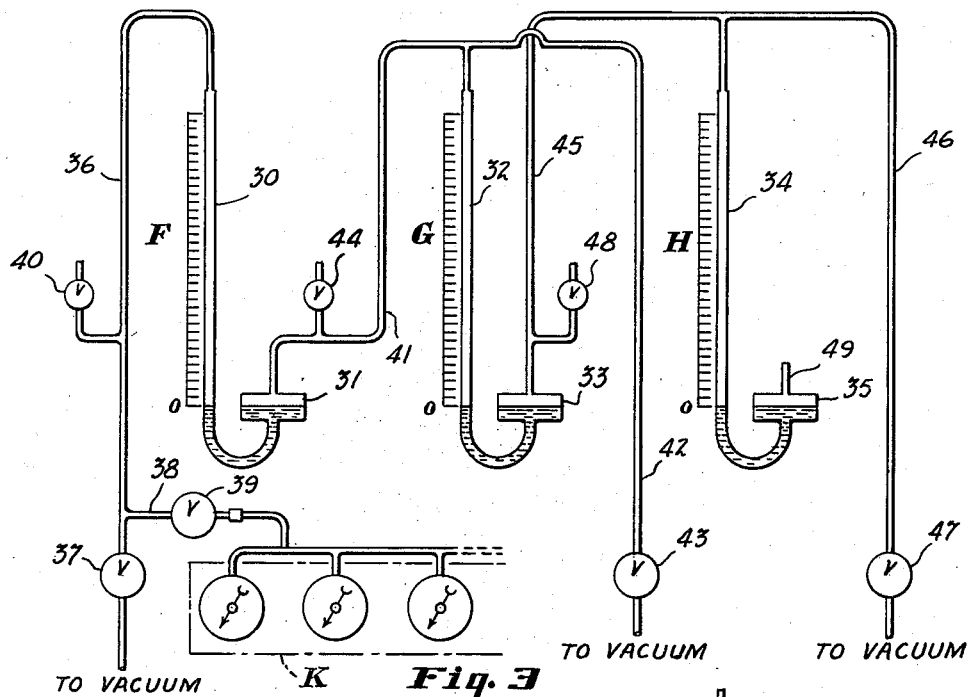
Fig. 3 is a diagrammatic view showing a series of manometer tubes interconnected for the measurement of subatmospheric pressures.

The multiple manometer set of the present invention may be employed for accurately measuring pressures below atmospheric by means of a liquid of very low specific gravity and extremely low vapor pressure, such, for example, as dibutylphthalate. An ordinary manometer of the U tube type employing such a light liquid would require a scale many times the length of the thirty inch scale required for measuring subatmospheric pressures with a mercury manometer and, although readings of greater accuracy could be obtained, it would be very difficult to take the readings. Fig. 3 of the drawings shows a series of manometers having relatively short indicating scales interconnected for measurement of subatmospheric pressures. Three manometers of the U tube type F, G and H, are connected together and to an instrument panel K. The manometer F has a vertical tube 30 for the pressure indicating liquid column that forms one leg, the other leg being enlarged to form a well 31. The manometers G and H are similar to manometer F, the manometer G having a vertical tube 32 and a well 33 and the manometer H having a vertical tube 34 and a well 35.

A conduit 36 connects the upper end of the tube 30 of manometer F to a vacuum creating means through a manually operable valve 37. A conduit 38 provided with a valve 39 is adapted to be connected to the instruments on the rack K which are to be calibrated and is connected to the conduit 36 between the valve 37 and the tube 30. A vent valve 40 is connected to the conduit 36 between the valve 37 and the tube 30 to connect the conduit 36 to the atmosphere when desired. A pressure balancing conduit 41 connects the well 31 of manometer F to the upper end of the tube 32 of manometer G. A conduit 42 connects the conduit 41 to a vacuum creating means and is provided with a manually operable valve 43. A manually operable vent valve 44 is connected to the conduit 41 to admit air under atmospheric pressure to the conduit 41 when desired. The well 33 of the manometer G and the upper end of tube 34 of the manometer H are connected by a pressure equalizing conduit 45. A conduit 46 controlled by a manually operable valve 47 connects the conduit 45 to a vacuum creating means. A vent valve 48 is provided for connecting the conduit 45 to atmosphere when desired. The well 35 of the manometer H is connected to atmosphere through a short upright tube 49.

Assuming the conduit 38 to be connected to the instruments to be calibrated and all valves to be closed, the valves 39, 40 and 44 will be opened to connect the instruments to the conduit 36 and to subject the liquid in the tube 30 and well 31 to atmospheric pressure. Then by manipulating the valves 37 and 40 the liquid column may be raised step by step in the tube 30, the valves 37 and 40 being closed after the desired pressure is established to permit the readings on the instruments to be compared to the readings on the manometer. By successive manipulations of the valves 37 and 40 the liquid column in the tube 30 will be raised to the uppermost graduation of the indicating scale, the readings on the instruments and on the manometer scale being taken after each lowering of pressure on the instruments and manometer F. After the liquid column in the tube 30 has been raised to the top of the scale of manometer F, the vent valve 44 is closed, the vent valve 48 is opened and the valve 43 is opened to exhaust air from the conduit 41 until the liquid column in the tube 30 of manometer F has been lowered to the zero point and the liquid column in the tube 32 of manometer G has been raised to the uppermost graduation of the scale of manometer G. The valve 37 may then be manipulated to again lower the pressure in conduit 36 step by step, successive readings on the manometers and on the instruments being taken while the liquid column in the tube 30 is being raised to the top of the indicating scale associated therewith, the subatmospheric pressure being the sum of the readings on manometers F and G.

After the column of liquid in tube 30 has been brought to the upper end of the associated scale for the second time, the vent valve 48 is closed and the valve 47 is opened to reduce pressure in the conduit 45, lower the liquid in tube 32 to the zero point and elevate the liquid in tube 34 to the top of the scale of manometer H. The valve 43 will then be opened to further decrease pressure in the conduit 41 to raise the liquid in tube 32 to the upper end of the scale of manometer G and to again lower the liquid in the tube 30 to the zero point. With the liquid in the tubes 32 and 34 of manometers G and H adjacent the upper ends of the scales of these manometers, the valve 37 may again be manipulated to intermittently lower the pressures applied to the instruments being calibrated and to manometer F and to permit comparison of the readings on the instrument and on the manometers, the sum of the readings on the three manometers showing the pressures applied to the instruments.

After the greatest vacuum to be measured has been attained, successive readings may be taken while the pressure in conduit 36 is being gradually increased. By manipulating vent valve 40, the liquid column in the tube 30 may be lowered step by step and when the column in tube 30 is lowered to the zero point, vent valve 44 may be opened to lower the liquid column in tube 32 of manometer G to the zero point and again raise the liquid column in the tube 30. Vent valve 48 may then be opened to establish atmospheric pressure in conduit 45, lowering the liquid column in tubes 34 of manometer H to zero and raising the column in tube 32 of manometer G. Step by step lowering of the column in tube 30 may then be effected by means of the vent valve 40 while readings are taken on the manometers F and G. After the liquid column in tube 30 has been lowered to zero for a second time, the vent valve 44 is opened to establish atmospheric pressure in the conduit 41 and again raise the liquid column in the tube 30. The pressure in the conduit 36 is then gradually raised to atmospheric by intermittent manipulation of the valve 40.

In the modifications above described the invention has been shown applied to well type manometers which are U-tube manometers in which the cross sectional area of one leg of the tube has been very greatly enlarged so as to provide a liquid reservoir. The invention may be applied to ordinary U-tube manometers in which both legs of the tube are identical, such manometer sets having the advantage that the same set may be used for either pressure or vacuum.

Figure 4:
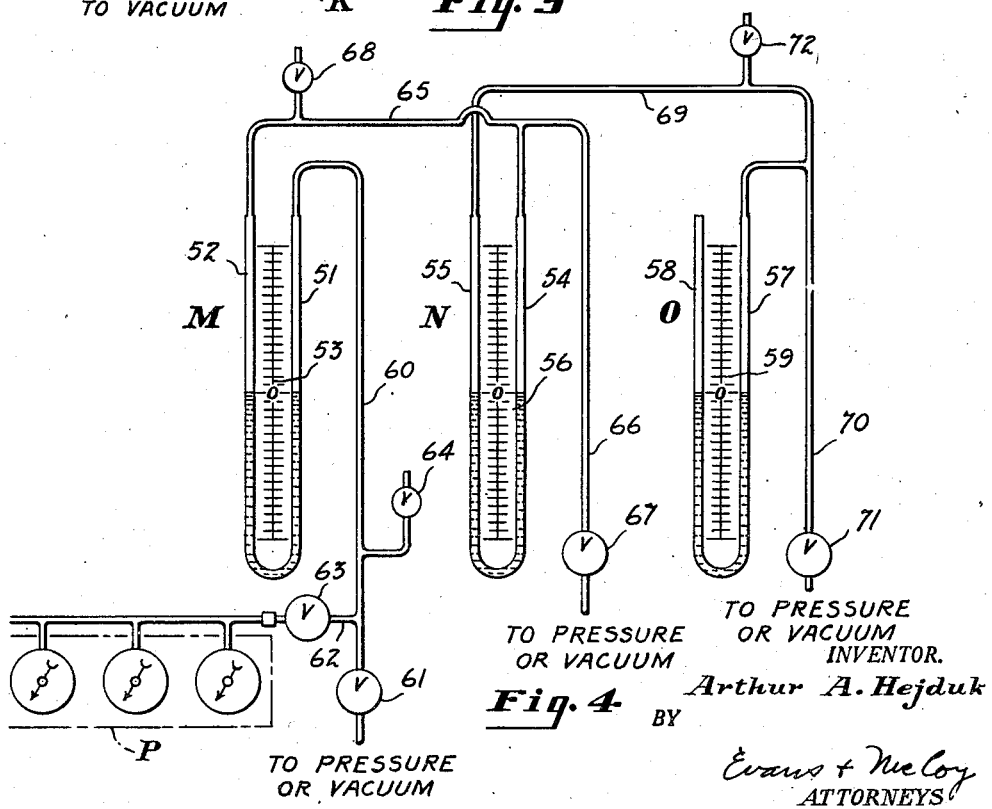
Fig. 4 is a diagrammatic view showing a series of interconnected tubes adapted to measure pressures either above or below atmospheric.

In Fig. 4 of the drawings three interconnected manometers M, N and O are shown for calibrating instruments on a rack P. The manometer M comprises a U-tube having vertical legs 51 and 52 and a scale 53 between its legs, the manometer N comprises a U-tube having legs 54 and 55 with a scale 56 between them and the manometer O comprises a U-tube having legs 57 and 58 with a scale 59 between them. The leg 51 of manometer M is connected through a conduit 60 to a source of pressure or vacuum and the conduit 60 has a manually operable valve 61 to control the pressure therein. A conduit 62 provided with a valve 63 is connected to the conduit 60 between the valve 61 and the tube 51 and is adapted to be attached to the instruments to be calibrated carried by the rack P. A vent valve 64 is connected to the conduit 60 between the valve 61 and the tube 51 to admit air from the atmosphere to the tube when subatmospheric pressures are being measured and to permit escape of air under pressure when pressures above atmospheric are being measured. A pressure balancing conduit 65 connects the upper end of the leg 52 of the manometer M to the upper end of the leg 54 of the manometer N. A conduit 66 provided with a valve 67 provides a connection between the conduit 65 and a source of pressure or vacuum and a connection to atmosphere is provided by means of a suitable manually operable vent valve 68. The leg 55 of the manometer N is connected to the leg 57 of the manometer O by means of a pressure balancing conduit 69 that is connected to a source of pressure or vacuum through a conduit 70 provided with a valve 71 and to atmosphere through a suitable vent valve 72.

Pressures above atmospheric and within the range of manometer M are indicated by the liquid column in the leg 52 of the manometer M. Pressures above atmospheric and up to the sum of the pressures registerable on the manometers M and N are indicated by the liquid columns in leg 52 of manometer M and leg 55 of manometer N. Higher pressures are measured by adding the readings obtained on leg 52 of manometer M, leg 55 of manometer N and leg 58 of manometer O. Pressures below atmospheric are measured by the liquid columns 51, 54 and 57 of manometers M, N and O. The valves are manipulated for pressure measurements in the same way as in the apparatus shown in Fig. 2 and for vacuum measurements the valves are manipulated in the same way as in the apparatus shown in Fig. 3.

As many manometers may be connected in series as desired, the last auxiliary manometer in each instance being connected to a source of pressure or vacuum and to the adjacent manometer in the same way as the manometer C in Fig. 2, the manometer H in Fig. 3 or the manometer O in Fig. 4, and all intermediate manometers being connected to adjacent manometers in the same manner as the manometer B in Fig. 2, the manometer G in Fig. 3 or the manometer N in Fig. 4.

The device of the present invention simultaneously measures the pressures applied to each of the manometers. The pressure applied to the main manometer is the sum of the readings on all of the manometers and the pressure applied to the auxiliary manometer connected to the main manometer is the sum of the readings on all the manometers except the main manometer. If a series of manometers are employed, the pressure of a given auxiliary manometer will be the sum of the readings on that manometer and all others connected to the leg thereof other than the leg connected to the main manometer.

While the device of the present invention is primarily designed for calibrating purposes, it can be used for other pressure measurements, providing the pressure measured is of a sufficiently steady nature to permit manometer readings to be taken simultaneously without great variation in liquid column deflection.

It is to be understood that variations and modifications of the specific device herein shown and described for purposes of illustration, may be made without departing from the spirit of the invention.

What I claim is:

1. Pressure measuring apparatus comprising main and auxiliary manometers of the U-tube type, each having two connected liquid containing legs, a pressure balancing conduit connecting one leg of the main manometer to a leg of the auxiliary manometer, a valve controlled vent for establishing atmospheric pressure in said conduit, manually controlled means for supplying fluid to and exhausting fluid from said conduit to vary at will the fluid pressure in said conduit, and means for transmitting the pressure to be measured to the other leg of the main manometer.

2. Pressure measuring apparatus comprising main and auxiliary manometers of the U-tube type, each having two connected liquid containing legs, a pressure balancing conduit connecting one leg of the main manometer to a leg of the auxiliary manometer, a pressure supply conduit connected to said pressure balancing conduit, a valve for closing said pressure supply conduit, a valve controlled vent connected to said pressure balancing conduit between said valve and the main manometer for varying the pressure in said pressure balancing conduit, and means for transmitting the pressure to be measured to the liquid in the other leg of the main manometer.

3. Pressure measuring apparatus comprising main and auxiliary manometers of the U-tube type, each having two connected liquid containing legs, a pressure balancing conduit connecting one leg of the main manometer tube to a leg of the auxiliary manometer, a valve controlled vent for establishing atmospheric pressure in said conduit, manually controlled means for supplying fluid to and exhausting fluid from said conduit to vary at will the pressure in said conduit, a conduit for connecting an instrument to be tested to the other leg of the main manometer and valve controlled means for varying the pressure in the latter conduit.

4. Pressure measuring apparatus comprising main and auxiliary manometers each having a well for liquid and a vertical indicating tube connected to the well, a pressure balancing conduit connecting the upper end of the main manometer tube to the well of the auxiliary manometer, a valve in said conduit for establishing or disestablishing communication between said manometers, a valve controlled vent connected to said conduit between said valve and the main manometer, a pressure supply conduit for delivering fluid under pressure to the well of the auxiliary manometer, a valve for closing said pressure supply conduit, and means for transmitting the pressure to be measured to the liquid in the well of the main manometer.

5. Pressure measuring apparatus comprising main and auxiliary manometers each having a well for liquid and a vertical indicating tube connected to the well, a pressure balancing conduit connecting the upper end of the main manometer tube to the well of the auxiliary manometer, a valve controlled vent for establishing atmospheric pressure in said conduit, means for supplying and maintaining a predetermined fluid pressure above atmospheric in said conduit, a conduit for connecting an instrument to be tested to the well of the main manometer and having an outlet connection, means for delivering fluid under pressure to said main manometer well, a valve for cutting off the flow of fluid to said instrument, and means for regulating the delivery of fluid to the main manometer well.

6. Pressure measuring apparatus comprising main and auxiliary manometers of the U-tube type each having two connected liquid containing legs, one of which is a vertical indicating leg, a pressure balancing conduit connecting the upper end of the main manometer indicating tube to a leg of the auxiliary manometer, a valve controlled vent for establishing atmospheric pressure in said conduit, means for supplying and maintaining a predetermined fluid pressure above atmospheric in said conduit, means for transmitting the pressure to be measured to the liquid in the other leg of the main manometer, a valve in said conduit for establishing or disestablishing communication between said manometers, and means for transmitting subatmospheric pressures to be measured to the upper end of the main manometer indicating leg.

7. Pressure measuring apparatus comprising main and auxiliary manometers of the U-tube type each having two connected liquid containing legs, one of which is a vertical indicating leg and the other of which is a pressure receiving leg, a pressure balancing conduit connecting the upper end of the main manometer indicating tube to the pressure receiving leg of the auxiliary manometer, a valve controlled vent for establishing atmospheric pressure in said conduit, means for supplying and maintaining a predetermined fluid pressure above atmospheric in said conduit, means for transmitting the pressure to be measured to the liquid in the pressure receiving leg of the main manometer, a valve in said conduit for establishing or disestablishing communication between said manometers, a connection through which pressure may be transmitted to an instrument to be tested, conduits from said connection to both legs of the main manometer, valve means for establishing or disestablishing connection between said connection and either leg of the main manometer, means for transmitting pressures above atmospheric to the pressure receiving leg of the main manometer, and means for transmitting pressures below atmospheric to the upper end of said main manometer indicating leg.

8. Pressure measuring apparatus comprising a manometer having a liquid receiving well and a vertical indicating tube connected to the well, a connection through which pressure may be transmitted to an instrument to be tested, conduits from said connection to said well and to the upper end of said indicating tube, valve means for establishing or disestablishing communication between said connection and said well and between said connection and the upper end of said tube, means for connecting said well to a source of pressure above atmospheric, means for connecting the upper end of said tube to a source of pressure below atmospheric, valves for connecting said pressure sources to the well and tube and for disconnecting the same, valve controlled means for venting said well to the atmosphere, and valve controlled means for venting the upper end of said tube to the atmosphere.

9. Pressure measuring apparatus comprising main and auxiliary manometers, each of the U-tube type having two connected liquid containing legs, one of which is a vertical indicating leg, means for transmitting subatmospheric pressures to be measured to the upper end of the indicating leg of the main manometer, a pressure balancing conduit connecting the other leg of the main manometer to the indicating leg of the auxiliary manometer, a vent for connecting said conduit to atmosphere, means for establishing subatmospheric pressures in said conduit, and a valve controlling said vent to vary the pressure in said conduit.

10. Pressure measuring apparatus comprising main and auxiliary U-tube manometers, each having two vertical liquid containing legs, a pressure transmitting conduit connected to one leg of the main manometer, a conduit connecting the other leg of the main manometer to a leg of the auxiliary manometer, a vent valve associated with each of said conduits, a cut-off valve in said pressure transmitting conduit, and a valve controlled pressure transmitting conduit connected to said connecting conduit.

11. Pressure measuring apparatus comprising a main manometer and an auxiliary manometer both of the U-tube type, each having two connected liquid containing legs, a pressure transmitting conduit connecting a leg of the main manometer to a leg of the auxiliary manometer, means for varying the pressure in said conduit comprising passages connecting said conduit to differential pressure sources and a valve controlling each of said passages, and means for transmitting pressure to the other leg of the main manometer.

12. Pressure measuring apparatus comprising a main manometer and an auxiliary manometer both of the U-tube type, each having two connected liquid containing legs, a pressure transmitting conduit connecting a leg of the main manometer to a leg of the auxiliary manometer, means for varying the pressure in said conduit comprising a passage connecting said conduit to atmosphere, a passage connecting said conduit to a source of pressure other than atmospheric and a valve controlling each of said passages, and means for transmitting pressure to the other leg of one of said manometers.

13. Pressure measuring apparatus comprising a main manometer and a plurality of auxiliary manometers of the U-tube type each having two connected liquid containing legs, a pressure balancing conduit connecting one leg of each manometer to a leg of the next adjacent manometer, means for varying the pressure in each of said pressure balancing conduits comprising a vent for connecting said conduit to atmosphere, a pressure transmitting conduit connected to said balancing conduit and independently operable valves controlling said vent and said pressure transmitting conduit, and means for transmitting the pressure to be measured to the other leg of the main manometer.

14. Pressure measuring apparatus comprising a main manometer and an auxiliary manometer, each having a well and a vertical indicating tube, means for transmitting subatmospheric pressures to be measured to the upper end of the indicating tube of the main manometer, a pressure balancing conduit connecting the well of the main manometer to the indicating tube of the auxiliary manometer, a valve controlled vent for connecting said balancing conduit to the atmosphere, and means including a valve controlled pressure transmitting conduit connected to said balancing conduit for establishing a subatmospheric pressure in said balancing conduit.

15. Pressure measuring apparatus comprising main and auxiliary manometers of the U-tube type, each having two connected liquid containing legs, a pressure balancing conduit connecting one leg of the main manometer tube to a leg of the auxiliary manometer, a conduit for connecting an instrument to be tested to the other leg of the main manometer, a vent connected to each of said conduits, a pressure transmitting conduit connected to each of said conduits, and a manually operable valve controlling each vent and each pressure transmitting conduit whereby the pressures in the balancing conduit and in the instrument connecting conduit may be varied at will and independently.

ARTHUR A. HEJDUK.

REFERENCES CITED

The following references are of record in the file of this patent:

UNITED STATES PATENTS

| Number | Name | Date |
|--------|------|------|
| 62,885 | Quinn | Mar. 12, 1867 |
| 412,830 | Bosworth | Oct. 15, 1889 |

FOREIGN PATENTS

| Number | Country | Date |
|--------|---------|------|
| 97,996 | Germany | June 30, 1898 |
| 108,386 | Great Britain | Aug. 9, 1917 |